Figure 1:
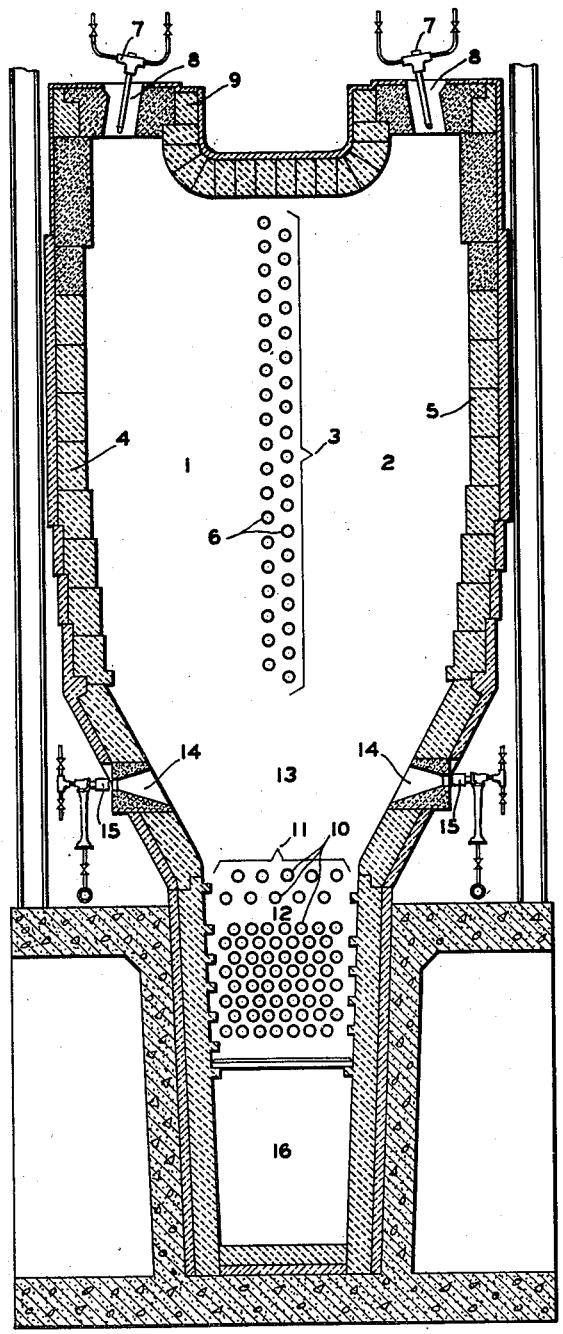

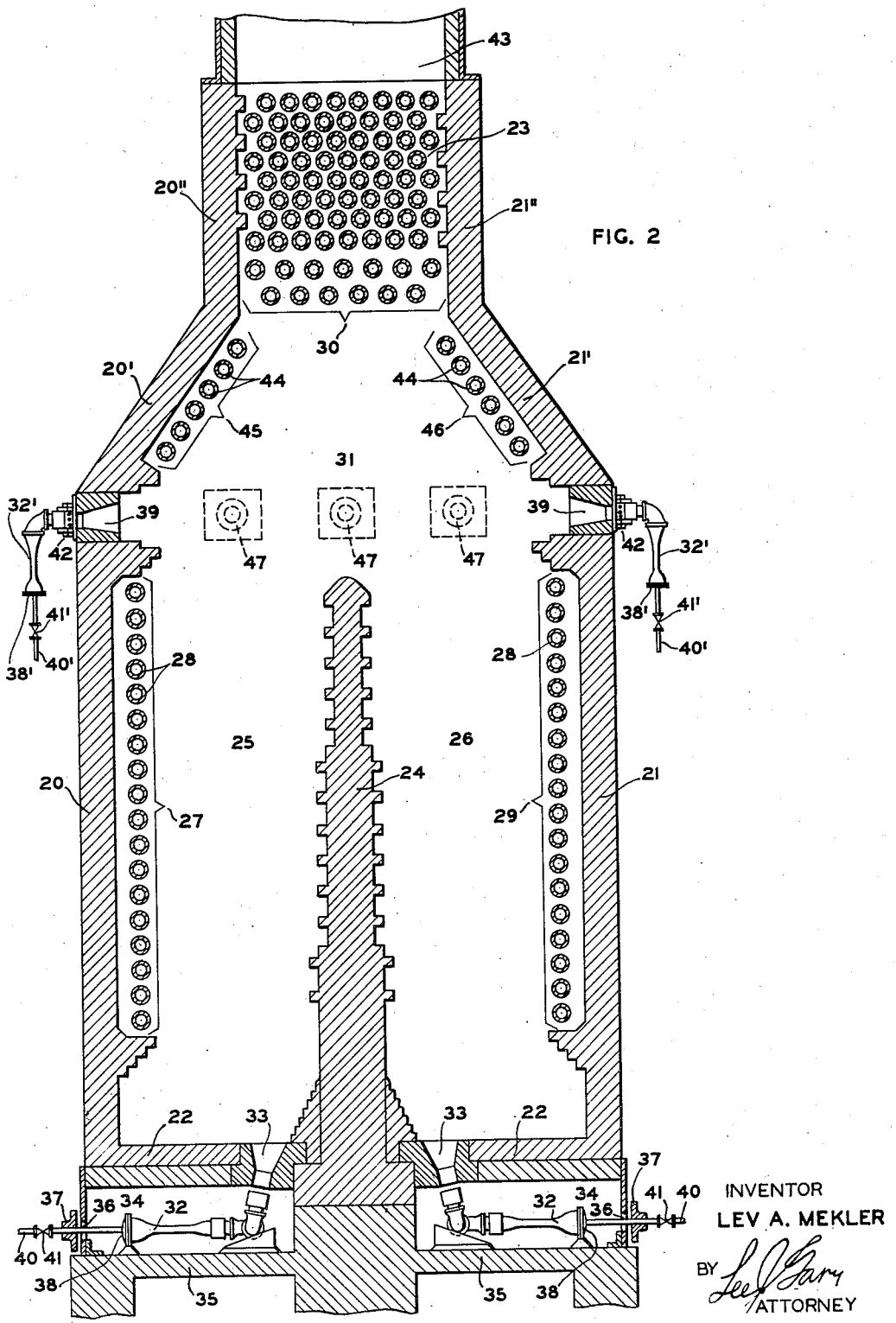

Patented Aug. 20, 1940

2,212,030

UNITED STATES PATENT OFFICE 2,212,030

HEATING OF FLUIDS

Lev A. Mekler, Chicago, Ill., assignor to Universal Oil Products Company, Chicago, Ill., a corporation of Delaware Application April 14, 1938, Serial No. 202,019

5 Claims. (Cl. 122—356)

This invention particularly refers to an improved method and means of heating hydrocarbon oils to the high temperatures required for their pyrolytic conversion, although the invention is also applicable to the heating of any type of fluid wherein it is desirable to employ relatively high rates of heat transfer and independently controlled heating conditions about different portions of the fluid conduit.

The invention is particularly well adapted to use in heaters of the type in which radiant heat is imparted to one or more tube banks, comprising a portion of the fluid conduit, from flames and hot combustion gases traversing that portion of the furnace wherein said tube bank or banks are located, and wherein the resulting partially cooled combustion gases are directly contacted in another portion of the furnace with one or more additional tube banks of the fluid conduit and supply fluid heat thereto. There are several well known forms of furnaces of this general type, one example of which is the so-called "equiflux" heater, while another example is the so-called "center-wall up-draft" heater.

In heaters of the type above outlined, the amount of heat available from the combustion gases in the fluid heating zone wherein they contact the last named portion of the fluid conduit is entirely dependent upon the amount of fuel burned in the combustion zone and the effectiveness with which the first named portion of the fluid conduit absorbs heat from the flames and hot combustion gases. The rate of heating obtained in said fluid heating zone cannot be varied without also varying the rate of heat absorption in the first mentioned portion of the fluid conduit nor without varying the total amount of fuel burned and the total heat input.

The present invention provides a method and means for obtaining independent control over the rates of heating in the radiant zone and in the fluid heating zone of the furnace whereby control of the heating curve is obtained and whereby the characteristics of the heating curve may be varied to suit the requirements of the particular oil undergoing treatment either with or without varying the amount of fuel burned and the total heat input. This is accomplished by providing a combustion or mixing zone between the radiant heating and fluid heating zones of the furnace, mixing additional fresh combustion gases in this combustion or mixing zone with the aforementioned partially cooled combustion gases from the radiant heating zone, passing the resulting mixture through said fluid heating zone, and by controlling the quantity of fresh combustion gases commingled with the partially cooled combustion gases in said mixing zone, independently of the quantity of fuel burned in the radiant heating zone of the furnace. This permits splitting the total amount of fuel utilized between the radiant heating zone and the mixing zone in any desired proportions, whereby the heat input to the fluid conduits in the radiant zone is controlled independently of the heat input in the fluid heating zone and whereby the heat input in the latter zone is controlled independently of the total amount of fuel burned and the total heat input to the two heating zones.

The accompanying diagrammatic drawings illustrate two specific forms of heaters in which the features of the invention are incorporated. Figure 1 is a cross-sectional elevation of a down-fired "equiflux" type of furnace and Figure 2 is a cross-sectional elevation of a center-wall up-draft type of heater.

Referring to Figure 1, the equiflux heating zone of the furnace is divided into two combustion and heating zones 1 and 2, separated by the equiflux tube bank 3 and disposed between this bank and the respective side-walls 4 and 5 of the furnace.

The tubular elements 6 of bank 3 extend horizontally between the end walls of the furnace, not here illustrated, and are connected, preferably in series, at their outer ends which extend outside the heating zone, by means of suitable return bends or headers, not shown. It will be noted that the tubes of each vertical row of bank 6 are arranged in staggered formation in relationship to the tubes of the opposite row and the spacing between adjacent tubes in each row is preferably such that neither side of any tube in this bank is materially shielded from direct radiation by the tubes in the opposite bank.

Burners 7 and firing ports 8 are provided in the roof 9 of the furnace through which regulated quantities of combustible fuel and air are supplied to each of the combustion zones 1 and 2. A plurality of spaced burners and burner ports, arranged in rows extending parallel to the side walls of the furnace, is preferably provided for each of the combustion zones 1 and 2 and the same or independently controlled amounts of combustible fuel may be supplied with the desired amount of air to each of these combustion zones whereby the temperature conditions prevailing in each may be maintained substantially the same or may be varied to suit requirements. Preferably, the burners are tilted slightly, as shown, toward the side walls 4 and 5 of the furnace, in such a manner that the flames and hot combustion gases will sweep downwardly over the side walls, heating the same to a highly radiant condition.

Heat is imparted to the left-hand side of each of the tubes in bank 3 by direct radiation from the flames and hot combustion gases in combustion zone 1 and by radiation from the hot refractory side wall 4. Heat is imparted to the right-hand side of each of the tubes in bank 3 by direct radiation from the flames and hot combustion gases in combustion zone 2 and by radiation from the hot refractory side wall 5.

The combustion gases passing downwardly through zones 1 and 2 are materially cooled by the heat absorbed therefrom by the tubular elements of bank 3 and, in the usual form of equiflux heater, these partially cooled gases are directly contacted after leaving combustion zones 1 and 2 with the tubular elements 10 of tube bank 11, which is disposed in a fluid heating zone 12 located beneath tube bank 6.

In the particular case here illustrated, a sufficient space 13 is provided between banks 3 and 11 to serve as a combustion zone wherein additional fuel is burned and the resulting hot combustion products commingled with the cooler gases from combustion zones 1 and 2 prior to their contact with the tubes of bank 11. Regulated quantities of fuel and air are supplied to zone 13 by means of firing ports 14 and burners 15, a plurality of which is preferably located on each side of the furnace. The amounts of fuel and air supplied to combustion zone 13 are controlled independently of the amounts of fuel and air supplied to each of the combustion zones 1 and 2 and the additional hot combustion gases generated in zone 13 mix with the combustion gases from zones 1 and 2 and serve to increase both the quantity and the temperature of the combustion gases entering zone 12, whereby higher rates of heating are obtained in tube bank 11.

The improvements of the present invention, in addition to increasing the rates of heating in zone 12, serves as a means of independently controlling the heating conditions about tube banks 3 and 11 over a wider range, thereby improving control of the heating curve obtainable. This is particularly advantageous as applied to the heating of hydrocarbon oils to the high temperature required for their pyrolytic conversion and permits the use of tube bank 11, for example, as either a preheating or "soaking" section (i. e. as a zone wherein cracking initiated in tube bank 3 is continued at an active rate) or, when desired, tube banks 3 and 11 may be employed for the simultaneous treatment of two different types of oil.

The combustion gases passing through zone 12 are cooled by direct contact with the tubular elements of bank 11 and upon leaving the fluid heating zone 12 are directed through flue 16 to a suitable stack, not shown.

Multiple cell "equiflux" heaters (i. e., those which employ a plurality of equiflux tube banks with a combustion zone on opposite sides of each) are now well known in the art and the features of the invention are adaptable to equiflux heaters of this type. Either combustion gases from each equiflux cell are supplied to a separate fluid heating zone of combustion gases from two or more equiflux cells are supplied to a single fluid heating zone. The adaptability of the invention in this respect will be readily apparent and these modifications are therefore not illustrated.

The invention is, of course, also applicable to up-fired as well as down-fired "equiflux" heaters.

Referring now to Figure 2, the up-fired, center-wall type of furnace here illustrated has refractory side walls 20 and 21, end walls, not illustrated, and a floor 22. The side walls 20 and 21 slope inwardly at 20' and 21' and the vertical extensions 20" and 21" of these walls, together with the end walls of the furnace define a fluid heating zone 23 of smaller cross-sectional area than the lower portion of the furnace.

A centrally disposed vertical wall 24 extending between the end walls of the furnace and from the floor to a point beneath fluid heating zone 23 divides the lower portion of the furnace into two separate combustion and heating zones 25 and 26.

A tube bank 27 which, in the case here illustrated, comprises a single vertical row of horizontally disposed tubes 28 is located adjacent side wall 20 and a similar tube bank 29 is disposed adjacent side wall 21.

A separate tube bank 30 comprising, in the case here illustrated, a plurality of superimposed horizontal rows of horizontally disposed tubes is located within the fluid heating zone 23.

The space defined by the sloping side walls 20' and 21' and the end walls of the furnace comprises another separate combustion and mixing zone 31 which is in direct communication at its lower end with the two combustion and heating zones 25 and 26 and directly communicates at its upper end with fluid heating zone 23.

A plurality of burners, such as indicated at 32, supply fuel in independently regulated amounts to each of the combustion zones 25 and 26. These burners are disposed, in the case here illustrated, beneath floor 22 and the flames issuing therefrom are directed upwardly at an angle against the opposite sides of wall 24 through firing ports 33. Regulated amounts of air are admitted to the spaces 34 between floor 22 and the foundation 35 through openings 36 controlled by suitable damper arrangements, such as indicated at 37. A portion of the air thus admitted to zones 34 passes through a suitable mixing device 38 on each of the burners, while the remainder is admitted around the mouth of the burners to the combustion zones through firing ports 33. Fuel is supplied to each of the burners through line 40 and valve 41.

The flames and hot combustion gases pass upwardly through zones 25 and 26 adjacent the opposite faces of wall 24, heating the latter to a highly radiant condition and radiant heat is transmitted from the opposite faces of wall 24 as well as from the flames and hot combustion gases in the combustion zones 25 and 26 to one side of each of the tubes in the respective banks 27 and 29. Reflected radiant heat is transmitted to the opposite side of each of the tubes of bank 27 from wall 20, while reflected radiant heat is transmitted to the opposite side of each of the tubes of bank 29 from wall 21.

The combustion gases issuing from zones 25 and 26 have, of course, been partially cooled by the liberation of heat to the tubes of the respective banks 27 and 29 and these partially cooled combustion gases pass into combustion and mixing zone 31, wherein they are commingled with additional independently regulated quantities of hotter combustion gases to increase the temperature and quantity of the combustion gases passing from zone 31 into and through fluid heating zone 23. This is accomplished, in the case here illustrated, by means of burners 32' from which fuel and air for combustion pass through firing ports 39 into zone 31. Controlled amounts of air are supplied to each of the burners 32' through mixing device 38' and fuel is supplied to burners 32' through lines 40' controlled by valves 41'. Additional independently regulated amounts of air may be supplied to zone 31 through firing ports 39 by the regulation of suitable damper arrangements, such as indicated at 42, adjacent the mouth of burners 32'.

The commingled combustion gases passing from zone 31 through zone 23 directly contact the tubes of bank 30 and supply fluid heat thereto at a rate which is controlled independently of the rates of heating employed in banks 27 and 29. The gases then pass from zone 23 through flue 43 to a suitable stack, not indicated.

Preferably, in the type of furnace shown in Figure 2 additional tubes 44 comprising banks 45 and 46 are disposed adjacent the respective sloping side walls 20' and 21' and receive heat by radiation and convection from the mixture of combustion gases in zone 31.

As an alternative to the particular means above described, whereby auxiliary firing is accomplished in zone 31, firing ports such as indicated, for example, by the dotted lines 47 may be provided in opposite end walls of the furnace through which combustible fuel and air may be supplied to zone 31 by means of a burner arrangement similar to that shown for the side firing ports 39. When this means of auxiliary firing is employed, tube banks 45 and 46 may be extended substantially to the upper ends of the respective tube banks 27 and 28 to provide additional heating surface.

Other specific means of firing zone 31 are, of course, entirely within the scope of the invention and, as an example of another alternative, a firing tunnel, not illustrated, provided with suitable openings for the discharge of hot combustion gases may be disposed within this zone and supported, for example, by wall 24, this tunnel preferably being fired at opposite ends through burner ports disposed in the opposite end walls of the heater.

As applied to heaters of the general type illustrated and above described, wherein combustion gases from separate combustion zones are commingled and supplied to a single fluid heating zone, the features of the invention, in addition to providing independent control over the rates of heating in the combustion zones and in the fluid heating zone, provide a means of better equalizing the temperature across the entire cross-sectional area of the fluid heating zone when different firing conditions are employed in the separate combustion zones, such as 25 and 26 of Figure 2 and 1 and 2 of Figure 1. This is due to the fact that intermediate firing, in the manner illustrated, in zone 13 of Figure 1 and zone 31 of Figure 2, for example, insures more thorough mixing of the two streams of partially cooled combustion gases supplied to this zone. Furthermore, by independently controlling the firing of the auxiliary burners on opposite sides of the combustion and mixing zone, more severe heating conditions may be employed in one side thereof than in the other to compensate for any difference in temperature between the two streams of partially cooled combustion gases entering the opposite sides of this zone.

It will, of course, be understood that the features of the invention are applicable to many other specific forms of heaters than the two herein illustrated and above described. For example, the features of the invention will be advantageous as applied to a heater of the same general form illustrated in Figure 2 with the central wall 24 omitted. The application of the features of the invention to other specific forms of heaters will be readily apparent to those familiar with the art and are, therefore, within the broad scope of the invention.

I claim:

1. A heater for fluids comprising, in combination, refractory side and end walls, a substantially vertical bank of horizontally disposed tubes located centraly between the side walls and dividing the space defined by said side and end walls into separate combustion zones, means including burners disposed adjacent one end of each of said side walls for supplying independently regulated quantities of fuel to each of said combustion zones and passing the resulting flames and hot combustion gases over and in intimate contact with the respective side walls, a separate combustion and mixing zone disposed adjacent the opposite ends of said side walls and directly communicating with each of said combustion zones, means including additional burners communicating with said combustion and mixing zone for supplying independently controlled additional quantities of fuel thereto and commingling the resulting combustion gases with combustion gases supplied to said combustion and mixing zone from each of the first mentioned combustion zones, a fluid heating zone separate from each of the aforementioned zones and directly communicating with said combustion and mixing zone, fluid conduits disposed in said fluid heating zone and means for passing commingled combustion gases from said combustion and mixing zone through said fluid heating zone in direct contact with the fluid conduits disposed therein.

2. A method for heating fluids which comprises independently burning fuel in each of a pair of combustion zones within a furnace and passing the resultant flames and combustion gases in a generally vertical direction through the combustion zones, applying heat by direct radiation from the flames and gases, while the flames and gases are moving vertically through the combustion zones, to fluid heating tubes disposed outside the main path of travel of the flames and gases through said zones, then combining the vertically moving streams of combustion products from said zones within the furnace while injecting into the combining streams, in a generally horizontal direction, fresh combustion products resulting from the separate combustion of independently controlled quantities of additional fuel, thereafter continuing the generally vertical movement of the combustion products through the remainder of the furnace and passing them during this continued vertical flow over and in contact with additional fluid heating tubes in the furnace whereby to impart substantial convection heat to the last-named tubes.

3. The method as defined in claim 2 further characterized in that said fresh combustion products are injected in opposed horizontal streams through opposite side walls of the furnace.

4. A fluid heating apparatus comprising a furnace having a pair of parallel combustion zones, a mixing zone and a fluid heating zone disposed in vertical arrangement in the order named, both of the combustion zones discharging into the mixing zone and the fluid heating zone being in open communication with the mixing zone, means for passing independent streams of combustion products through the combustion zones in a generally vertical direction to be combined in the mixing zone and then passed vertically through the fluid heating zone, fluid heating tubes disposed outside the main path of travel of the streams of combustion products through the combustion zones and arranged to receive direct radiant heat from the combustion products, burner means arranged for introducing fresh combustion products in a generally horizontal direction into said mixing zone, and additional fluid heating tubes in said fluid heating zone and disposed within the main vertical path of the combustion products through this zone of the furnace.

5. A fluid heating apparatus comprising a furnace having a pair of parallel combustion zones, a mixing zone and a fluid heating zone disposed in vertical arrangement in the order named, both of the combustion zones discharging into the mixing zone and the fluid heating zone being in open communication with the mixing zone, means for passing independent streams of combustion products through the combustion zones in a generally vertical direction to be combined in the mixing zone and then passed vertically through the fluid heating zone, fluid heating tubes disposed outside the main path of travel of the streams of combustion products through the combustion zones and arranged to receive direct radiant heat from the combustion products, burners projecting through opposite side walls of the furnace and arranged for introducing fresh combustion products in a generally horizontal direction into said mixing zone, and additional fluid heating tubes in said fluid heating zone and disposed within the main vertical path of the combustion products through this zone of the furnace.

LEV A. MEKLER.